Figure 1:
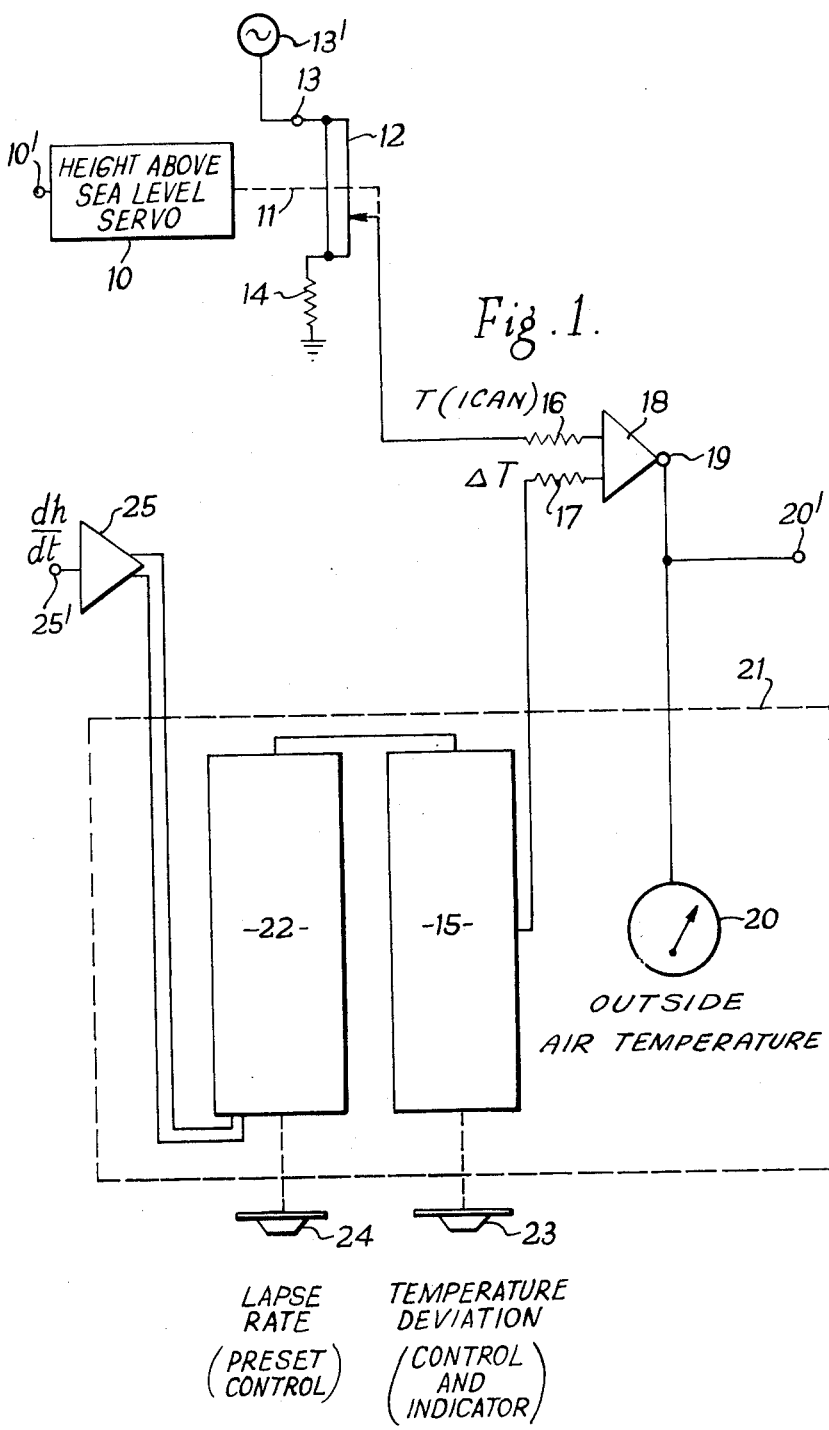

United States Patent Office 3,233,342
Patented Feb. 8, 1966

3,233,342
FLIGHT TRAINING OR SIMULATING APPARATUS
Bernard Arthur Bridges, Crawley, and Ronald Arthur Marvin, Horsham, Sussex, England, assignors to Communications Patents Limited
Filed Aug. 5, 1963, Ser. No. 300,008
Claims priority, application Great Britain, Aug. 20, 1962, 31,854/62
2 Claims. (Cl. 35—12)

This invention relates to ground-based flight training or flight simulating apparatus and in particular to flight training or simulating apparatus in which the physical properties of the atmosphere are simulated.

In ground-based flight trainers and simulators, instruments are provided which represent the instruments of an actual aircraft. These instruments are actuated by a computer, so as to indicate simulated conditions of flight and engine operation. Some of these instruments may also indicate simulated atmospheric conditions, that is to say atmospheric temperature and pressure.

These properties of the atmosphere affect the flight and engine performance of modern aircraft so much that it is necessary to reproduce these properties exactly in flight trainers and flight simulators for such aircraft.

The temperature of the atmosphere varies with altitude and standards have been set by the International Committee for Aeronautical Navigation (ICAN) which define the temperature of a mean atmosphere in terms of sea level temperature at various latitudes on the earth's surface. The lapse, or temperature gradient, of the ICAN mean atmosphere taken vertically is uniform, the lapse-rate being 1.98° C. per 1,000 feet. The value is taken as positive when air temperature decreases with height. It is assumed that the deviation of actual air temperature above or below ICAN standard temperatures never exceeds 30° C.

In conventional flight training apparatus, it is usual to incorporate an atmosphere computing system in which simulated air temperature outside of the simulated aircraft is computed on the basis of the ICAN mean atmosphere. The sea level temperature, corresponding to the latitude at which simulated flight is to take place, is set in by an instructor before the commencement of an exercise.

In actual flight, however, the temperature lapse rate may vary with height in a random manner and it may be positive, zero or negative. Hitherto, any attempt on the part of the instructor to reproduce such random conditions during an exercise, for example by adjustment of the sea level temperature pre-setting control, have resulted in unrealistic rapid or abrupt changes in the readings of the air temperature instrument and in the readings of other instruments associated with systems which are dependent upon air temperature.

It is an object of the present invention to provide, in flight training apparatus, a computing system for simulating temperature conditions of the atmosphere in which the temperature lapse rate may be varied and in which unrealistic changes in the indications of instruments of the apparatus may be substantially avoided.

It is a further object of the invention to provide a computing system for simulating temperature conditions of the atmosphere in which the temperature lapse rate may be positive, zero or negative.

Accordingly, the invention provides apparatus for simulating variation of temperature with height in flight training or flight simulating apparatus comprising first computing means, having an input dependent upon time rate of change of height, for computing a mean standard temperature varying with height, according to a standard rate, second computing means, having a first input dependent upon time rate of change of height and a second input corresponding to a desired rate of change of temperature with height, for computing the difference temperature between said mean standard temperature and a temperature varying with height according to said desired rate of change and third computing means for computing the resultant of said mean standard and difference temperatures.

Figure 2:
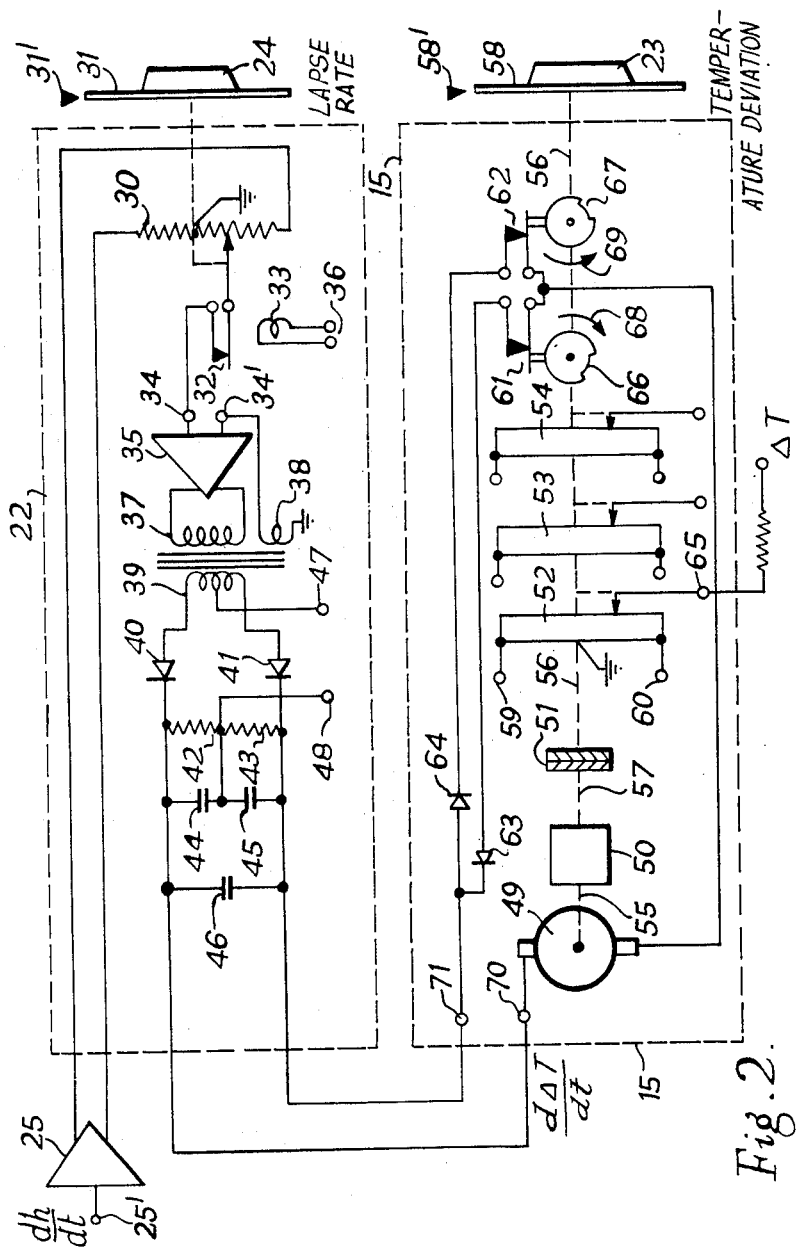

In order that the invention may be readily carried into effect, an embodiment thereof will now be described, by way of example, with reference to the accompanying drawings, in which:

FIG. 1 is a block schematic diagram of a temperature computing system for use in the atmosphere computing system of a flight simulator, in which is incorporated means whereby the temperature lapse rate may be varied; and FIG. 2 is a schematic diagram of computing units of the temperature computing system.

In FIG. 1, an integrating servo 10, forming part of the height computing system of a flight simulator, has an output shaft 11 coupled to the wiper of a potentiometer 12. The input 10' of the servo 10 is fed with a rate of climb/dive signal obtained from computing elements of the height computing system of the simulator, which are not shown in the drawing. The output of the integrator, that is to say, the computed height, is represented by the angular displacement of the shaft 11. The winding of potentiometer 12 and a resistor 14 are connected in series and are fed with alternating current from a source of supply 13' connected to terminal 13. The law of the potentiometer is such that the electrical signal output from the wiper varies with height according to the standard ICAN lapse rate of 1.98° C. 1,000 feet. The value of series resistor 14 is chosen to provide a minimum signal output corresponding to a sea level temperature of 15° C.

The ICAN temperature signal from the wiper of potentiometer 12 and a temperature deviation signal, obtained from a computing unit 15, are fed, via summing resistors 16 and 17 respectively, to the input of a summing amplifier 18. The computing unit 15 is described in detail later in the specification, with reference to FIG. 2. In the absence of a signal input to resistor 17 the signal from output terminal 19 of amplifier 18 represents solely the temperature of the ICAN mean atmosphere in the temperate zone, where the mean sea level temperature is 15° C.

The output signal from terminal 19 is fed to an indicating instrument 20, indicating simulated outside air temperature, and to elements of the computer of the simulator, not shown in the diagram, by way of output terminal 20', in which quantities involving terms which are functions of temperature are computed. The instrument 20 is calibrated to indicate temperatures between +45° and —70° C.

The instrument 20 is located on the temperature panel of a console, shown in the diagram by the broken outline 21, from which the computed temperature conditions are controlled. The console 21 is that part of the simulator which is under the supervision of the instructor.

The temperature deviation computing unit 15 and a lapse rate computing unit 22 are also located on the panel 21. Units 15 and 22 are provided with manual control knobs 23 and 24 respectively, to enable the Instructor to adjust the temperature lapse rate and temperature deviation from the ICAN mean value manually, according to the requirements of an exercise.

The lapse rate computing unit 22 is fed with a signal obtained from an amplifier 25, which is part of the height computing system of the simulator. The input to amplifier 25, at input terminal 25', is a rate of change of height signal, represented by $$\frac{dh}{dt}$$

obtained from other computing elements of the height computing system, which are not shown in the drawing.

Referring now to FIG. 2, in which items of the system shown in FIG. 1 are indicated by the same reference numbers as in FIG. 1, the lapse rate computing unit 22 has a potentiometer control 30, provided with a linear winding which is centre-tapped. The winding is fed in push-pull with a rate of change of height signal $$\frac{dh}{dt}$$

obtained from the output of amplifier 25. Attached to the control knob 24 is a dial 31 having a linear graduated scale calibrated to enable non-standard temperature lapse rates between $+3°$ C. and $-3°$ C. per 1,000 feet to be set in manually to the lapse rate computing unit 22. The dial 31 is set with respect to an index 31' to indicate the standard positive lapse rate of 1.98° C. per 1,000 feet with the wiper of the potentiometer at the centre-tap position.

The displacement of the wiper from the centre-tap represents the difference between the mean standard lapse rate and a desired lapse rate provided by the setting of the control 24, that is to say, to $$\frac{d\Delta T}{dh}$$

where $\Delta T$ is the temperature deviation from ICAN standard temperature.

The signal from the wiper of potentiometer 30 therefore corresponds to the value:

$$\frac{dh}{dt} \times \frac{d\Delta T}{dh} = \frac{d\Delta T}{dt}$$

This signal is fed, via contacts 32 of a relay 33, to input terminal 34 of an amplifier 35. The winding of relay 33 is connected via terminal 36 to the computer of the simulator.

The relay 33 is energised so that contacts 32 are closed and a signal is fed to the amplifier 35, only when the simulator is in the "off ground" condition. A transformer 37, having secondary windings 38 and 39, is connected in the output circuit of the amplifier 35. The secondary winding 38 provides a feedback signal to input terminal 34' of the amplifier 35.

The signal across secondary winding 39 is an A.C. signal of variable amplitude and having a phase angle relative to a reference phase angle which may be 0° or 180°. This signal is fed to a conventional phase-sensitive demodulator arrangement to obtain a D.C. signal, the magnitude and sign of which corresponds to the amplitude and phase of the signal fed to the demodulator input.

The demodulator arrangement comprises diodes 40 and 41, resistors 42 and 43 and capacitors 44, 45 and 46, arranged in a conventional circuit arrangement. In the arrangement, a single-ended carrier wave, applied to terminals 47 and 48, is added to the push-pull signal across the secondary winding 39 and the sum is applied to the diodes 40 and 41. The carrier wave is greater in amplitude than the signal across the winding 39 and the addition of the two signals therefore causes amplitude selection in diodes 40 and 41 on alternate half cycles of the carrier wave.

The D.C. signal generated across capacitor 46 is fed to input terminals 70 and 71 of the unit 15. Unit 15 is a servo-type integrator and comprises a bi-directional D.C. motor 49, speed-reduction gear 50, friction clutch 51 and potentiometers 52, 53 and 54. The motor armature is coupled by a shaft 55 to the speed-reduction gear 50. The wipers of the potentiometers 52, 53 and 54 are mechanically coupled to a common shaft 56, which is mechanically coupled through the clutch 51, to an output shaft 57 of the speed-reduction gear 50. One brush of the motor 49 is connected to input terminal 70, the other brush is connected, via contact pairs 61 and 62 and diodes 63 and 64 to input terminal 71. The purpose of these diodes and contacts will be explained later in the specification.

The speed and direction of rotation of the armature of the motor corresponds respectively to the amplitude and polarity of the signal fed to the brushes. Thus, the angular displacement of the shaft 56 is the time integral of the signal applied to terminals 70 and 71, that is to say to the value:

$$\int \frac{d\Delta T}{dt} \cdot dt = \Delta T$$

Attached to the shaft 56 is the manual control knob 23 provided with a dial 58 having a scale calibrated to enable temperature deviations of $\pm 30°$ C. to be represented. The dial 58 is set with respect to an index 58' so that the scale indicates zero when the wiper of potentiometer 52 is at the centre position of the winding.

The winding of potentiometer 52 is centre-tapped and is fed with alternating current from a source of supply connected to terminals 59 and 60 of the same relative phase and frequency as the source connected to terminal 13, FIG. 1. The wiper is connected to terminal 65. The output signal from terminal 65 therefore corresponds to $\Delta T$, that is to say to the temperature deviation from ICAN standard temperature.

The shaft 56 is coupled to speed-reduction gear 50 by the friction clutch 51. This enables the instructor to set the temperature deviation at the commencement of an exercise to zero if ICAN standard conditions are required or, alternatively, to positive or to negative deviation values, if for example flights in tropical or arctic latitudes are to be simulated. The computed temperature deviation from ICAN standard temperature is indicated throughout the exercise by the setting to which dial 58 is moved by shaft 56.

Cams 66 and 67, attached to the shaft 56, actuate contact pairs 61 and 62 respectively to prevent the temperature deviation boundaries of $\pm 30°$ C. from ICAN standard temperature from being exceeded. The contact pair 61, in series with diode 63, is opened by rotation of the shaft in the direction of arrow 68 when a temperature deviation of $+30°$ C. is exceeded. The contact pair 62, in series with the diode 64, is opened by rotation of the shaft in the direction of the arrow 69 when a temperature deviation of $-30°$ C. is exceeded. The diodes 63, 64 are in series with the armature of the motor 49 and are connected to conduct currents flowing through the armature in opposite directions.

If an output signal of a given polarity is maintained, the armature comes to rest when a temperature deviation of $\pm 30°$ C. is exceeded, the diode connected to the closed contact being non-conductive for a signal of that polarity.

If the polarity of the input signal is reversed, corresponding to a reduction in the temperature deviation, the diode connected to the closed contact is conductive and the armature rotates in a direction to reduce the temperature deviation.

Potentiometers 53 and 54 are associated with other computing systems of the simulator, not described herein, in which quantities involving terms which are functions of temperature deviation are computed.

The wiper of potentiometer 52 is connected through terminal 65 to the summing resistor 17, at the input of an amplifier 18, FIG. 1.

Referring again to FIG. 1, the ICAN temperature/altitude signal and the temperature deviation signal are fed to amplifier 18 by way of summing resistors 16 and 17 respectively. The values of resistors 16 and 17 are chosen so that the temperature scales of the two inputs are similar. The signal from the output terminal 19 therefore corresponds to the outside air temperature, in the vicinity of the simulated aircraft, at the altitude at which the simulated flight is taking place. The temperature is indicated by the instrument 20 and the temperature deviation from ICAN standard temperature is indicated by the scale of dial 58.

Height above sea level is indicated by an instrument associated with the height computing system, located in another section of the console. Hence, it is possible for the instructor to adjust the temperature lapse rate to a value between —3° C. per 1,000 feet and +3° C. per 1,000 feet at any predetermined height from sea level to the maximum height computed by the simulator.

If the lapse rate is set to zero at a predetermined height, the computed air temperature remains constant and a condition corresponding to that of the tropopause is simulated.

What we claim is:

1. Apparatus for simulating variation of temperature with height in flight training or flight simulating apparatus comprising first computing means having an input dependent upon time rate of change of height for computing a mean standard temperature varying with height according to a standard rate, second computing means having a first input dependent upon time rate of change of height and a second input corresponding to a desirable rate of change of temperature with height for computing the difference temperature between said mean standard temperature and a temperature varying with height according to said desirable rate of change, third computing means for computing the resultant of said mean standard and difference temperature, means for indicating throughout an exercise said computed difference temperature determined by said third computing means, and means for adjustably indicating the temperature lapse rate with height to positive, zero, and negative values, said second computing means having a third input corresponding to an initial value of said difference temperature, said second computing means comprising a first part having the first and second inputs for determining the difference rate between the desired and standard rates of change of temperature with height for computing the product thereof with the first input and a second part having said third input for computing the sum of the integral with time of said difference rate and the initial difference temperature, said first part of the second computing means comprising a potentiometer set according to the second input supplied with an alternating current of magnitude corresponding to the first input and supplying an alternating current signal to a phase-sensitive demodulator the output from which is supplied to the second part of said second computing means.

2. Apparatus as claimed in claim 1, in which the second part of the second computing means comprises a servo motor driven at a rate corresponding to the electrical signal from the first part thereof to position a shaft correspondingly to the said temperature difference, the position of which shaft is independently set according to the third input and said shaft setting a potentiometer providing an output signal supplied therefrom to the third computing means.

References Cited by the Examiner

UNITED STATES PATENTS

| | | | |
|---|---|---|---|
| 2,798,308 | 7/1957 | Stern et al. | 35—12 |
| 2,842,867 | 7/1958 | Dehmel | 35—12 |
| 2,947,089 | 8/1960 | Dawson | 35—12 |
| 3,003,251 | 1/1961 | White et al. | 35—12 |
| 3,105,308 | 10/1963 | Peck | 35—12 |

EUGENE R. CAPOZIO, *Primary Examiner.*

LAWRENCE CHARLES, JEROME SCHNALL,
*Examiners.*